US005152044A

United States Patent [19]

Bales

[11] Patent Number: 5,152,044

[45] Date of Patent: Oct. 6, 1992

[54] APPARATUS FOR REMOVING FLEXIBLE IMPELLER FROM A PUMP HOUSING

[76] Inventor: Stephen A. Bales, 1161 Mustang Dr., Danville, Calif. 94526

[21] Appl. No.: 809,586

[22] Filed: Dec. 17, 1991

[51] Int. Cl.[5] ............ B23P 19/04

[52] U.S. Cl. ............ 29/257; 29/266; 269/126; 269/211; 269/249

[58] Field of Search ............ 29/256, 257, 266, 270; 269/37, 40, 41, 43, 126, 211, 249, 252, 253

[56] References Cited

U.S. PATENT DOCUMENTS 971,375 9/1910 Hays ............ 29/257
1,793,560 2/1931 Schmieder ............ 269/37
2,305,995 12/1942 Roberts ............ 29/256
3,041,713 7/1962 Gronlund ............ 29/256
3,540,698 11/1970 McFarland ............ 29/257
3,846,891 11/1974 Elg ............ 29/257

*Primary Examiner*—J. J. Swann
*Attorney, Agent, or Firm*—Thomas R. Lampe

[57] ABSTRACT

An apparatus for removing a flexible impeller from a pump housing. The apparatus includes a base member, first and second arms connected to the base member and movable relative to each other, and an actuator for clamping the arms on the core of the flexible impeller.

4 Claims, 1 Drawing Sheet

APPARATUS FOR REMOVING FLEXIBLE IMPELLER FROM A PUMP HOUSING

TECHNICAL FIELD

This invention relates to the art of fluid pumps and, more particularly, for apparatus useful in the disassembly of fluid pumps incorporating flexible impellers.

BACKGROUND ART

Fluid impeller pumps are utilized in a wide variety of operating environments, one example being the use of flexible impeller pumps in ships and boats. It is not unusual for a single vessel to incorporate a plurality of such devices. Fluid impeller pumps are also widely employed in non-maritime, industrial applications.

Impeller pumps are characterized by their incorporation of an impeller having a central core and a plurality of vanes projecting therefrom. When the core or central portion of the impeller is mounted on the pump drive shaft, the vanes will engage the interior wall of the pump housing. Rotation of the impeller will pump liquid or other fluid from one location to another.

Normal wear and tear necessitates the periodic removal of impellers from their respective pump housings. This chore is one dreaded by the seafarer and others. Removal of an impeller is most commonly accomplished through the use of conventional hand tools such as pliers or screwdrivers. Quite often, considerable friction exits between the impeller and the drive shaft from which it is being removed, and conventional hand tools are inadequate for the job under such circumstances. Damage to the pump housing is a common occurrence as the person struggling to remove the impeller maneuvers the pliers, screwdrivers, or the like in an attempt to extract a stubborn impeller. Scratching or gouging of the pump housing by the extracting tools may be so severe as to require replacement or, at the very least, expensive repair of the damaged housing.

DISCLOSURE OF INVENTION

The apparatus disclosed herein is for the purpose of quickly and efficiently removing a flexible impeller from a pump housing. The apparatus is characterized by its relative simplicity, ease of use, and low cost.

The apparatus includes a base member. A first arm is connected to the base member, said first arm having a distal end spaced from the base member defining a first clamping surface for engaging the impeller.

A second arm is connected to the base member, the second arm having a distal end spaced from the base member and defining a second clamping surface for engaging the impeller Actuator means is operatively associated with the first and second arms to cause relative movement between the first and second arm distal ends for clamping the impeller between the first and second clamping surfaces whereby the apparatus may be utilized to exert a pulling force on the impeller to extract the impeller from the housing.

The first and second distal ends are of a size and configuration permitting the distal ends to be inserted between impeller vanes and clamped into position on opposed sides of the impeller central portion.

At least one of the arms is pivotally connected to the base member and the actuator means cooperates with said at least one arm to pivotally move same relative to the base member.

The actuator means comprises a first actuator element extending between the arms and a second actuator element movable relative to the first actuator element and cooperable with the arms during movement thereof relative to the first actuator element to effect relative movement between the arms. The first actuator element is adjustably connected to one of the arms whereby the arm may be selectively positionable at a plurality of locations along the length of the first actuator element. Also, adjustment means is provided for selectively adjusting the location of pivotal attachment between the base member and one of the arms.

Other features, advantages, and objects of the present invention will become apparent with reference to the following description and accompanying drawings.

BEST MODE FOR CARRYING OUT THE INVENTION

Figure 1:
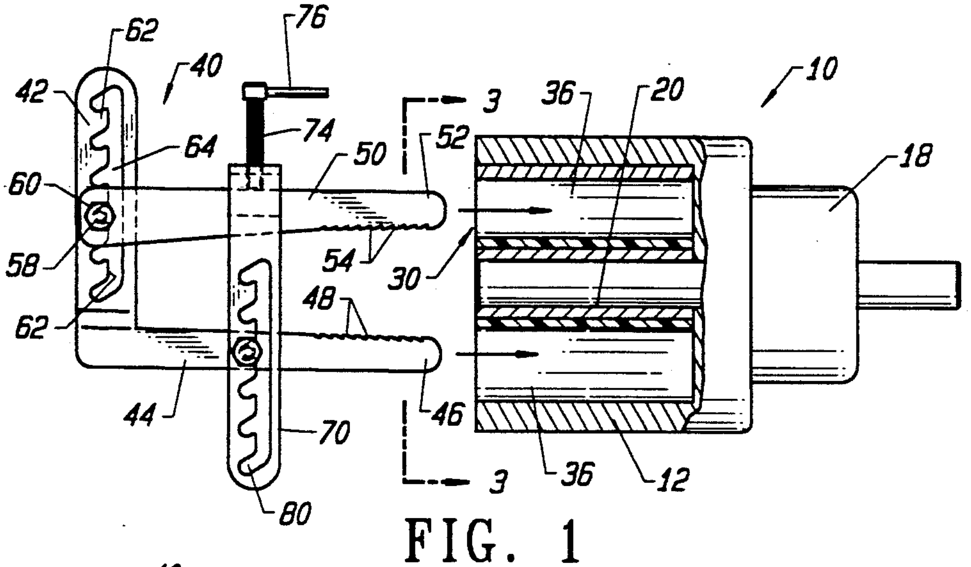
FIG. 1 is a side elevational view of apparatus constructed in accordance with the teachings of the present invention prior to positioning thereof within a pump housing having an impeller therein, said impeller and a portion of the pump housing being shown in section.

Referring now to the drawings, a typical liquid impeller pump is generally designated by reference numeral 10. Impeller pump 10 includes a housing 12 defining an interior 14 partially defined by interior wall 16.

Pump 10 includes a motor 18 having a drive shaft 20 which projects into interior 14 at a central location therein. An insert 22 is located within housing 12 in the vicinity of outlet 24 and inlet 26 which are in fluid-flow communication with the interior of the pump housing.

Impeller pump 10 also includes an impeller 30 including a central portion or core 32 defining a recess 34 which receives drive shaft 20 and is rotatable therewith. Although not illustrated, a keyway, spline, or other mechanical arrangement may be employed to prevent relative rotation between the drive shaft 20 and the impeller. Impeller 30 also includes a plurality of spaced flexible vanes 36 which project from the central portion, extending about the periphery thereof. The distal ends of the vanes are in engagement with housing interior wall 16.

The impeller pump construction just described is typical and forms no part of the present invention. It will also be appreciated that impeller pump 10 operates in a conventional manner wherein additional flexing of the vanes occurs in the vicinity of insert 22 to promote the passage of fluid between outlet 24 and inlet 26.

The apparatus constructed in accordance with the teachings of the present invention is generally designated by reference numeral 40. The apparatus 40 is hand held and is for the purpose of manually extracting impeller 30 from the housing of an impeller pump such as impeller pump 10. To accomplish this the end cover or plate (not shown) normally connected to the housing 12 must be removed from the end of the housing spaced from motor 18. This is the condition of the impeller pump shown in the drawings.

Apparatus 40 includes a base member 42 formed of steel plate or the like. Integral with base member 42 is a first arm 44 having a distal end 46 spaced from the base member. Grooves 48 are formed at the first arm distal end as shown to provide a clamping surface.

Apparatus 40 also includes a second arm 50 having a distal end 52. Grooves 54 are formed at distal end 52 as illustrated to provide a clamping surface.

Projecting from the end of second arm 50 remote from the distal end thereof is a connector pin 58. In the illustrated embodiment, connector pin 58 is in the form of a shaft connected to a nut 60. The connector pin may be affixed to the second arm as by welding or may comprise a shaft threadedly connected to the second arm or completely passing therethrough and maintained in position by a second nut. The alternate approach of utilizing a separate nut has not been illustrated. The shaft may be threaded or without threads.

Pin 58 is selectively positionable in notches formed by teeth 62 defined by base member 42. A slot 64 formed in the base member communicates with the notches between the teeth. Thus, the connector pin 58 and the end of the second arm 50 to which it is connected can be moved within the slot 64 and selectively positioned between any adjoining teeth. This means that the second arm 50 may pivot about selected various locations along the length of the base member.

Actuator means is operatively associated with the first and second arms to cause relative movement between the first and second arm distal ends for clamping the impeller between the grooved clamping surfaces 48, 54. The actuator means includes a first actuator element 70 and a second actuator element 72.

First actuator element 70 extends between and beyond arms 44, 50. As can be seen with reference to the drawings, the first actuator element 70 has a bend at the upper end thereof defining a threaded hole within which threaded shaft 74 of the second actuator element is threadedly engaged. Rotation of threaded shaft 74 by a handle 76 affixed thereto will cause the threaded shaft 74 to move toward or away from second arm 50. The end of the threaded shaft bears against second arm 50 so that the second arm will pivot in a clockwise direction about pin 58 when the threaded shaft 74 is rotated to move in the direction of the second arm.

First actuator element 70 defines a slot 80 and a plurality of teeth 82 projecting into the slot. Slot 80 slidably accommodates a locking pin 84 which projects from first arm 44. If desired, the locking pin 84 may be a threaded member which threadedly engages the first arm or passes through an aperture in the first arm and is maintained in position by a nut threadedly engaged therewith at opposed sides of the first arm. Alternatively, the locking pin may be in the form of a stud without threads. In any event, the locking pin 84 may be slid in slot 80 and selectively alternatively accommodated in any of the notches between the teeth 82.

To operate apparatus 10, the arms 44, 50 are relatively adjusted so that the distal ends thereof freely fit central portion 32 of the impeller 30 on opposed sides of the central portion. Adjustment may readily be accomplished through use of the adjustment structure described in detail above. In this manner the apparatus can be used with different sized impellers.

Figure 2:
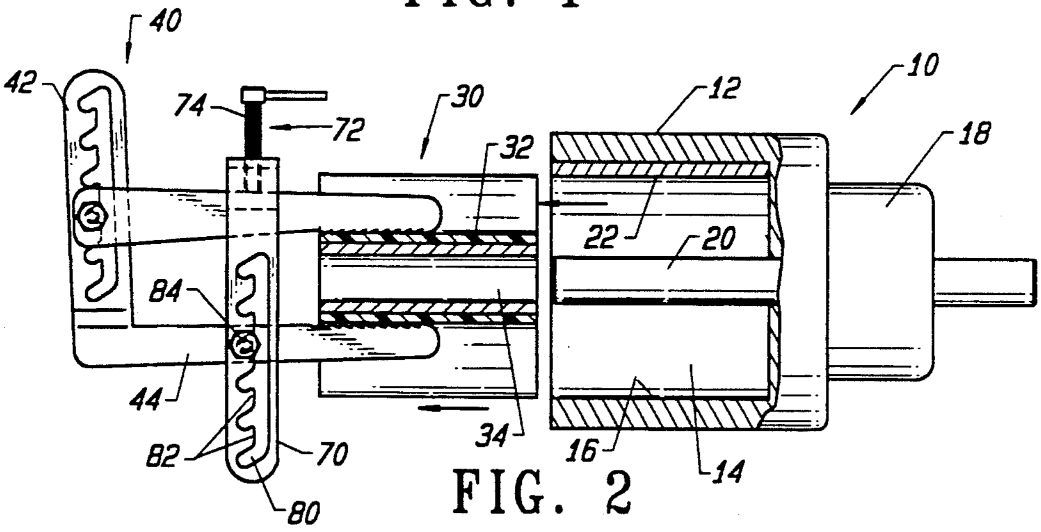
FIG. 2 is a view similar to that of FIG. 1 but illustrating the apparatus in engagement with the impeller which has been removed from the housing.
Figure 3:
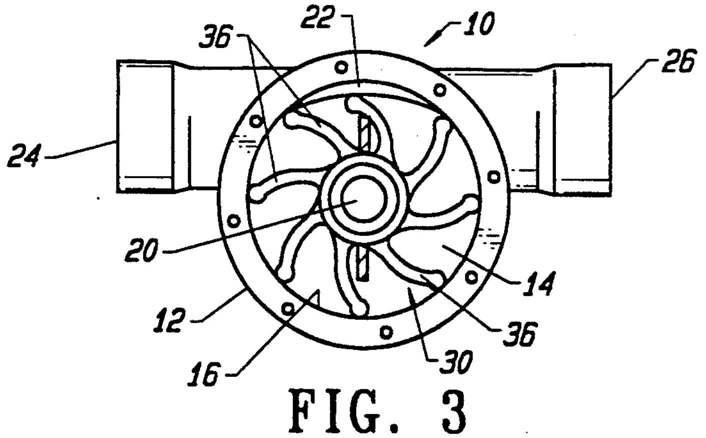
FIG. 3 is an end view of an open pump housing and illustrating an impeller herein as taken in the direction of line 3—3 in FIG. 1.
Figure 4:
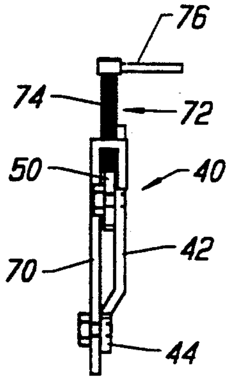
FIG. 4 is a side elevational view of the apparatus.

The next step in the utilization of the apparatus is to move the clamping surfaces of the distal ends of the arms into tight engagement with the core or central portion 32 of the impeller. In other words, the apparatus is clamped into place, the clamping being accomplished by rotating threaded shaft 74 by handle 76. When the core of the impeller is securely clamped, the operator exerts a pulling force on the apparatus in the direction of the arrows shown in FIG. 2, thus removing the impeller from the drive shaft 20 and housing interior. This is readily accomplished without any marring or injury to the pump housing.

I claim:

1. Apparatus for removing a flexible impeller from a pump housing, said impeller having a central portion defining a recess receiving a drive shaft when said impeller is positioned in said housing and spaced flexible vanes projecting from said central portion, extending about the periphery thereof, and in engagement with a housing interior wall when said impeller is positioned in said housing, said apparatus comprising, in combination:

a base member defining a first elongated slot and having a plurality of teeth projecting into said first elongated slot;

a first arm fixedly connected to said base member, said first arm having a first distal end spaced from said base member defining a first clamping surface for engaging said impeller;

a second arm pivotally connected to said base member, said second arm having a second distal end spaced from said base member defining a second clamping surface for engaging said impeller and including a connector pin for slidable movement in said first elongated slot and selectively engageable with the teeth projecting into said first elongated slot to adjust the location of pivotal connection between the base member and second arm;

actuator means operatively associated with said first and second arms to cause pivotal movement of said second arm about said connector pin relative to said base member and relative movement between said first and second arm distal ends for clamping said impeller between said first and second clamping surfaces whereby said apparatus may be utilized to exert a pulling force on said impeller to extract said impeller from said housing, said actuator means comprising a first actuator element extending between said arms and a second actuator element movable relative to said first actuator element and cooperable with said arms during movement thereof relative to said first actuator element to effect pivotal movement of said second arm relative to said base member and relative movement between said arms, said second actuator element comprising a threaded shaft threadedly engaging said first actuator element and bearing against one of said arms to pivot said second arm relative to said base member responsive to rotation of said threaded shaft; and means for adjustably interconnecting said first actuator element to at least one of said arms whereby said first actuator element may be selectively positionable at a plurality of locations relative to the arm to which it is adjustably interconnected.

2. The apparatus according to claim 1 wherein said first and second distal ends are of a size and configuration permitting said distal ends to be inserted between impeller vanes and be clamped into position on opposed sides of said impeller central portion.

3. The apparatus according to claim 1 wherein said means adjustably interconnecting said first actuator element to at least one of said arms comprises a plurality of teeth defined by the first actuator element and a locking pin projecting from the arm to which said first actuator element is adjustably interconnected, said locking pin being selectively engageable by said teeth.

4. The apparatus according to claim 3 wherein said teeth project into a slot defined by the first actuator element, said slot for slidably accommodating said locking pin.

* * * * *